Figure 3:
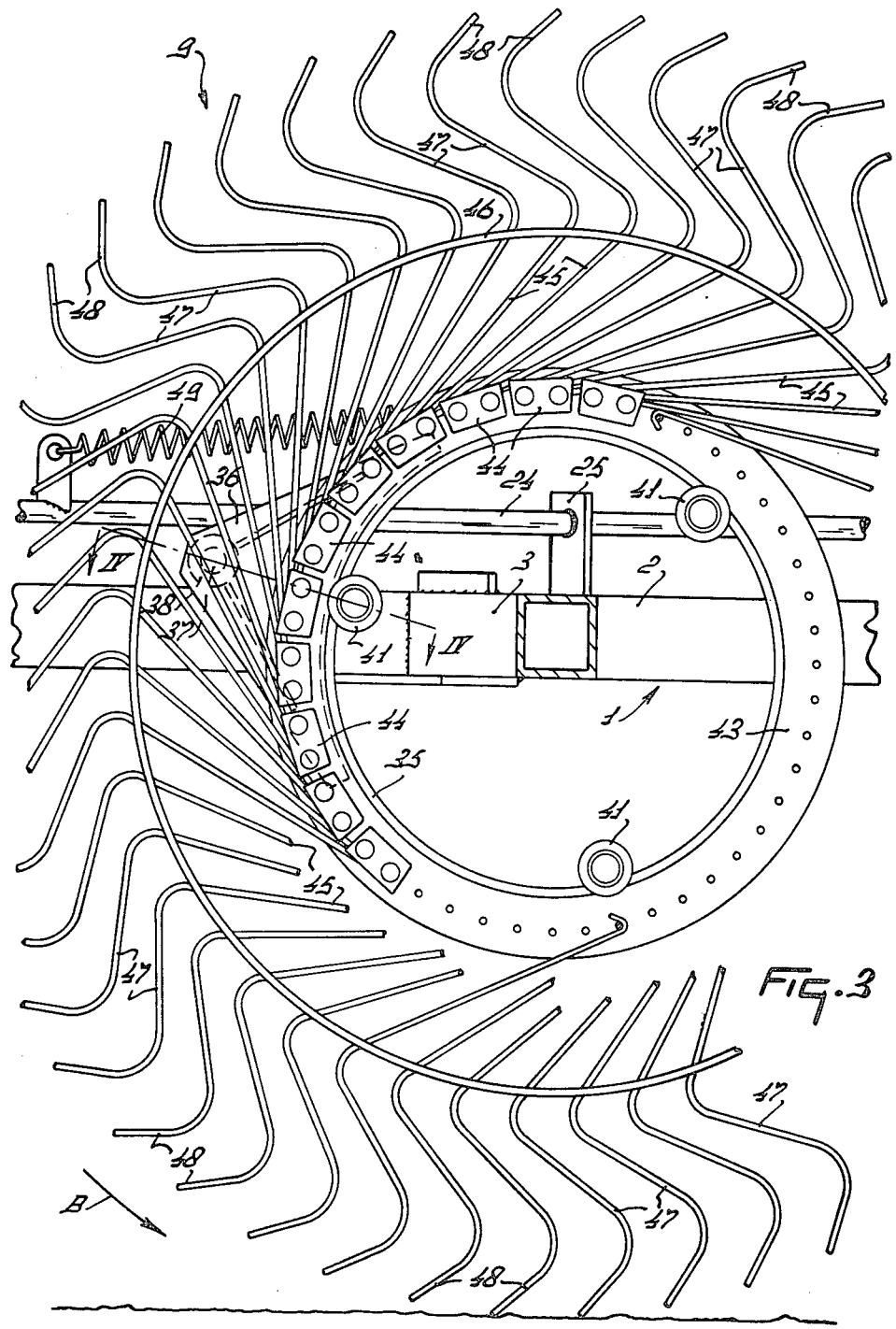

United States Patent [19]

van der Lely et al.

[11] 4,324,093
[45] Apr. 13, 1982

[54] DEVICE FOR DISPLACING CROP LYING ON THE GROUND

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 134,174

[22] Filed: Mar. 26, 1980

[30] Foreign Application Priority Data

Mar. 30, 1979 [NL] Netherlands .......................... 7902483

[51] Int. Cl.³ ............................................ A01D 77/06
[52] U.S. Cl. ..................................................... 56/377
[58] Field of Search .................. 56/377; 172/383, 386, 172/414; 280/86; 308/DIG. 7

[56] References Cited

U.S. PATENT DOCUMENTS

| 3,104,512 | 9/1963 | Lely et al. | 56/377 |
| 3,452,529 | 7/1969 | Millar | 56/377 |
| 3,706,191 | 12/1972 | Barbot | 56/377 |
| 4,154,451 | 5/1979 | Young | 172/386 |

FOREIGN PATENT DOCUMENTS 255120 12/1963 Australia ...................... 308/DIG. 7
2514493 11/1975 Fed. Rep. of Germany ...... 172/383
1270201 10/1960 France .......................... 308/DIG. 7

Primary Examiner—Robert A. Hafer

[57] ABSTRACT

A device for displacing crop lying on the ground such as a side-delivery rake or tedder, has a frame supporting a row of ground-driven rake wheels each of which is movable up and down with respect to the frame. The device can be coupled to a tractor by a fastening structure that includes a frame portion passed through a central hole in one rake wheel. The frame portion connects the beam carrying the rake wheels, to a drawbar of the frame portion. By passing the frame portion through the rake wheel, the fastening structure can be of minimal dimensions reducing the damaging effect of forces applied to the fastening structure during use of the device. The rake wheels are similar to one another except the wheel with a central hole. The hole is surrounded by a circular hub rotatably mounted on fixed rollers on a structure connected to the frame. A supporting ground wheel for the frame is pivoted to a frame support and the pivot interconnected with the frame by a stabilizer that resists the extreme pivotal movements of the ground wheel.

29 Claims, 10 Drawing Figures

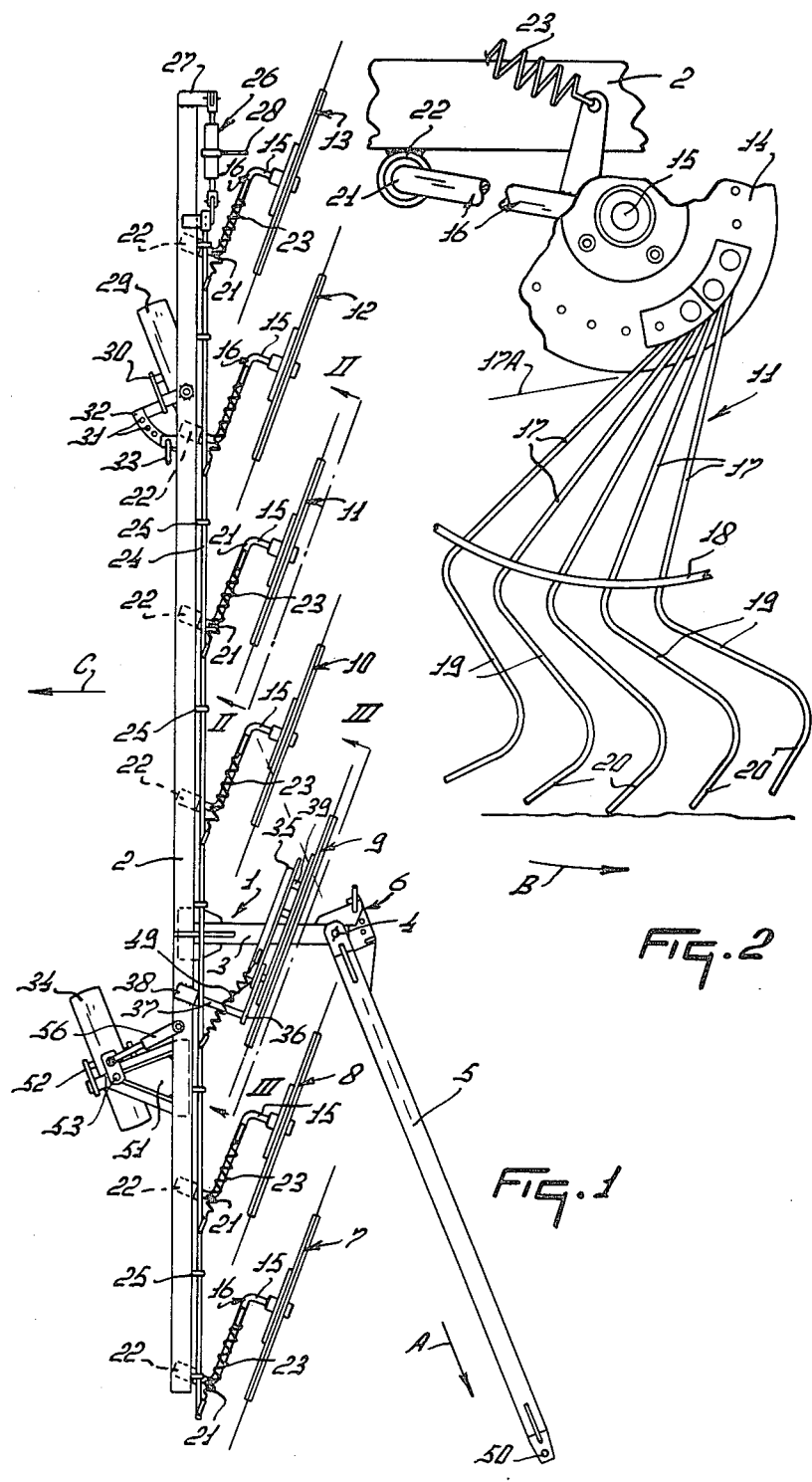

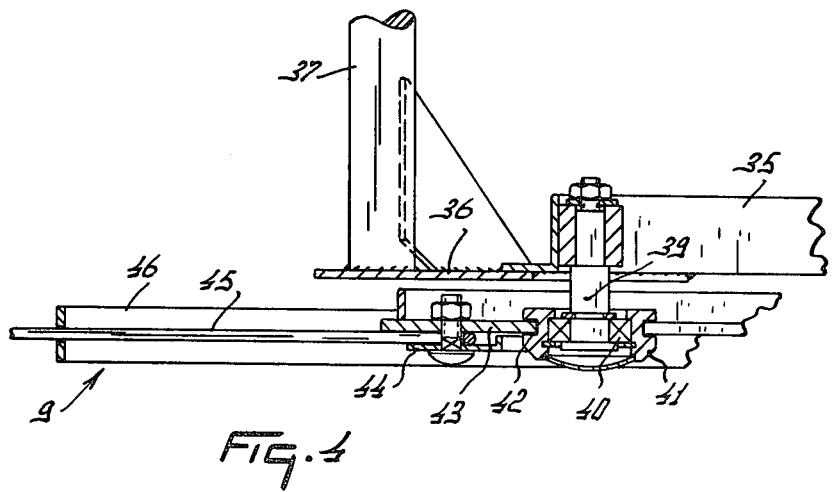
FIG. 4
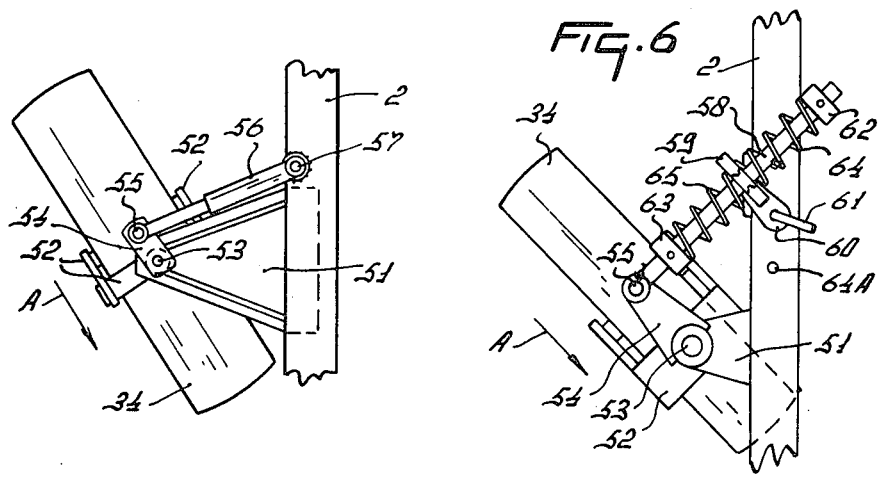
FIG. 6
FIG. 5

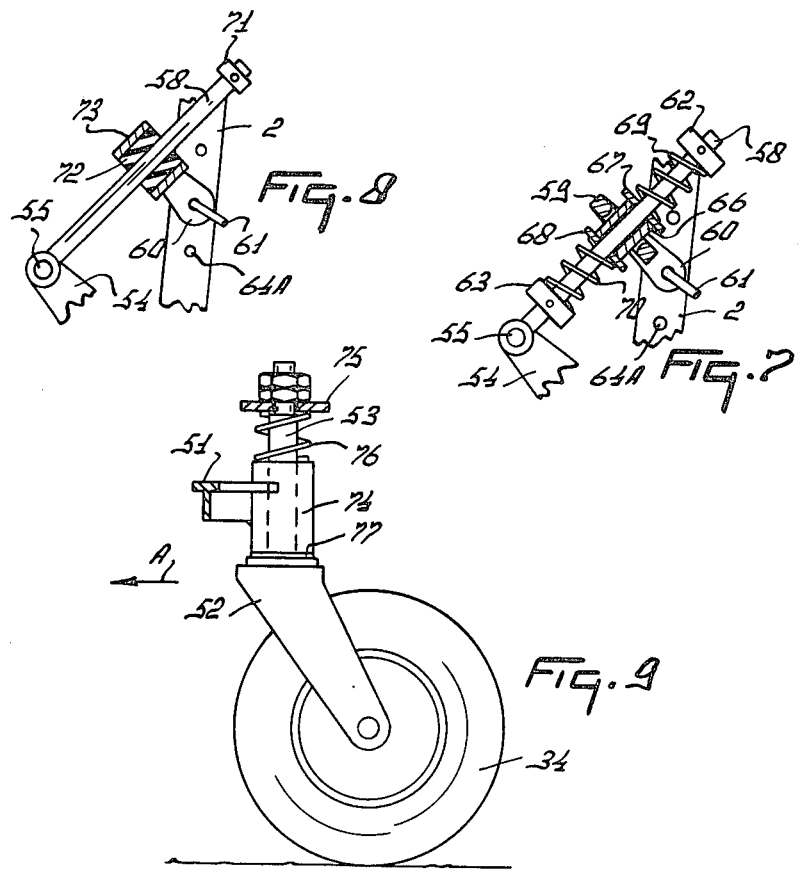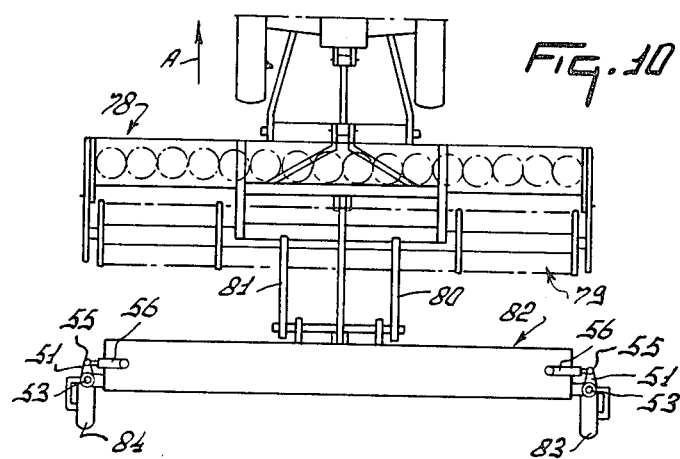

DEVICE FOR DISPLACING CROP LYING ON THE GROUND

This invention relates to a device for displacing crop lying on the ground.

According to the present invention there is provided a device for displacing crop lying on the ground comprising a frame supporting a row of ground-driven rake wheels each movable up and down with respect to the frame, the row being inclined with respect to the intended direction of operative travel of the device over the ground; one of the rake wheels having a hub bounding a hole through which passes a frame portion. Such a device may be employed as sidedelivery rake or tedder. By passing a portion of the frame through one rake wheel, this portion can be of minimal length and a fastening structure for the device as a whole, for fastening the device to a propelling vehicle such as a tractor, can be of minimal dimensions thereby to minimise the damaging effect of forces applied to the fastening structure in use of the device.

For a better understanding of the invention and to show how the same may be carried into effect, reference will now be made, by way of example, to the accompanying drawings, in which:

FIG. 1 is a plan view of a device for displacing crop lying on the ground,

FIG. 2 is a view of one rake wheel of the device of FIG. 1, taken in the direction of arrows II—II in FIG. 1 but with part of the rake wheel omitted for the sake of clarity, FIG. 3 is a view of another rake wheel taken in the direction of arrows III—III in FIG. 1, part of this rake wheel also being omitted, FIG. 4 is a sectional view taken in the direction of arrows IV—IV in FIG. 3, FIG. 5 is a plan view of a first form of a ground wheel construction of the device, FIG. 6 is a plan view of a second form of a ground wheel construction of the device, FIG. 7 is a plan view of part of a third form of ground wheel construction, FIG. 8 is a plan view of part of a fourth form of ground wheel construction, FIG. 9 is a side view of a fifth form of ground wheel construction, and FIG. 10 is a plan view of a further use to which ground wheel constructions as shown in FIGS. 5 to 9 can be put.

Referring first to FIG. 1, the device has a frame 1 including a frame beam 2 extending substantially horizontally, during operation of the device, inclined (as viewed in plan) to the direction of operative travel (arrow A) of the device over the ground. The frame also includes a frame portion in the form of a beam 3 that also extends substantially horizontally during operation, this beam 3, as viewed in plan, being at right angles to the frame beam 2, to which it is rigidly secured. The junction between the beam 3 and the frame beam 2 is located at a distance from the leading end of the frame beam 2, viewed with respect to the direction of travel A, that is about 30 to 40% of the total length of the frame beam 2. The length of the beam forming the frame portion 3, which is located on one side of the frame beam 2, is about 10 to 15% of the overall length of the frame beam 2.

In the end of the frame portion 3 remote from the frame beam 2 is journalled a substantially vertical pivot shaft 4, about which a drawbar 5 extending substantially horizontally during operation is pivotable. The drawbar 5 is fixable in any selected one of a plurality of positions with the aid of a fixing device 6 of known type. The drawbar 5 may be replaced by a trestle which can be fastened to a three-point lifting device of a tractor.

The frame beam 2 is provided with a row of ground-driven rake wheels 7 to 13, the line of connection between the centers of these rake wheels being, viewed in plan, inclined to the direction of travel A of the device. Viewed with respect to this direction of travel, the rake wheels 7 to 13 are located in front of the frame beam 2 with the rake wheels 7 and 8 and part of the rake wheel 9 disposed between the frame beam 2 and the drawbar 5. The rake wheels 7 and 8, and the rake wheels 10 to 13 have identical dimensions and structures and they have a diameter of, for example, 1.40 ms. The rake wheel 9 has a structure differing from that of the other rake wheels and in the form illustrated its diameter amounts to 1.65 ms. The rake wheel 9 may, however, have the same diameter as the remaining rake wheels 7,8 and 10 to 13.

Each of the rake wheels 7,8 and 10 to 13 has a structure known per se and illustrated in FIG. 2 in which a sheet material hub 14 of the rake wheel is journalled on a rotary shaft 15 formed by the end of a crank 16 (see also FIG. 1). The inner boundary of the hub 14 substantially coincides with the outer circumference of the rotary shaft 15. To the hub 14 are clamped a large number of spring-steel torsional rods 17, root portions of which are straight and extend substantially tangentially to the periphery of the rotary shaft 15, the inner ends of these root portions being located at a short distance from the center of the rake wheel. From the hub 14 the root portions of the rods 17 extend rearwardly with respect to the direction of operative rotation B of the rake wheel and slightly outwards with respect to lines 17A tangential to the circumference of the hub at the point where each root portion passes through this circumference. The torsional rods 17 constitute spokes of the rake wheel and, at the same time, resilient elements with the aid of which the tines of the rake wheel are supported. Each of the torsional rods 17 is freely movable in a hole in a felly 18 of the rake wheel. Directly outside this felly each rod 17 is bent over so as to extend forwards with respect to the direction of operative rotation B of the rake wheel and outwards with respect to the felly 18 to form a tine carrier 19, at the outer end of which the rod is again bent over so as to extend rearwards with respect to the direction of rotation B of the rake wheel, where it forms a tine 20. Each tine 20, its tine carrier 19 and the associated torsional rod 17 is thus an integral member made from a single length of spring steel wire.

Though each tine 20 in the described construction is thus very flexible with respect to the associated hub 14 and is, therefore, quite capable of matching unevennesses of the ground, it is desirable, under certain conditions, for the rake wheel as a whole to be movable up and down with respect to the frame. For this purpose the leading end portion 21 of each crank 16, viewed with respect to the direction of travel A, (this portion 21 being parallel to the rotary shaft 15 of the associated rake wheel) is pivotally mounted in a bearing 22 secured to the frame beam 2. The cranks 16 are thus pivotal with respect to the frame beam 2. The rotary shafts 15 and the end portions 21 of all the cranks 16 (all of which have the same positions relative to the beam 2) are each at an angle of about 10° to 30° to a vertical plane at right angles to the frame beam 2. Near the end portion of each crank 16 that forms the rotary shaft 15 of the associated rake wheel is fastened (to a lug extending upwardly from the crank 16 in the illustrated construction) one end of a tension spring 23, which extends away from the fastening point, viewed in plan, substantially parallel to the central portion of the crank 16 forwardly with respect to the direction of travel A. The other end of each spring 23 is secured to a set rod 24 common to all the springs, this rod 24 extending parallel to the frame beam 2 and being located at a short distance from the beam 2. The set rod 24 is supported, so as to be slidable with respect to the beam 2, by means of a plurality of bearings 25. The trailing end of the set rod 24 is located, viewed in plan, behind the rearmost bearing 22, where it is connected with a setting device 26, the rear end of which is fastened to a support 27 provided at the trailing end of the beam 2. The setting device 26 is constructed so that its length measured in a direction parallel to the frame beam 2 can be varied manually (lever 28, FIG. 1) or by hydraulic agency. The setting device 26 may consist of a rod having left-hand and right-hand screwthreads located inside similarly screwthreaded sleeves which are non-rotatably fastened to the rod 24 and the support 27 respectively, the screwthreaded rod being rotatable with the aid of the lever 28. Alternatively the setting device 26 can include a hydraulic ram which can be operated from a tractor drawing the device. The setting device 26 may alternatively be located near the leading end of the frame beam 2. By means of the setting device the rod 24 is axially displaceable in the bearings 25 with respect to the frame beam 2.

Near its trailing end the frame beam 2 is supported at the level of the rake wheel 12 by a ground-engaging wheel 29 supported by a wheel carrier 30 to which is secured an arcuate strip 32 having holes 31. Through any one of these holes 31 can be passed a locking pin 33, which is in a stationary position relative to the frame beam 2 during operation. In this way the orientation of the rotary shaft of the ground wheel 29 can be fixed with respect to the frame beam 2 so that the rotary axis of the ground wheel 29 is at right angles to the drawbar 5 or the direction of travel A. Near the leading end of the frame beam 2, at approximately the position of the rake wheel 8, a ground wheel 34 supports the frame beam 2. The structure of this ground wheel 34, which is pivotable with respect to the frame 1 during operation, will be described more fully hereinafter.

The rake wheel 9 of the device has a specific structure. The rake wheel 9 is journalled on an open ring 35 (FIGS. 3 and 4), which is rigidly secured by means of a sheet material triangular support 36 to pivot shaft 37, which is pivotally fastened by means of a bearing 38 (see also FIG. 1) to the top of the frame beam 2. Viewed in plan, the ring 35 is parallel to the central portions of the cranks 16 of the other rake wheels and constitutes itself also part of a crank. The triangular support 36 is arranged parallel to the plane of the ring 35 and is welded to the ring near the boundary surface of the ring 35 facing the rake wheel 9. Away from the ring 35 the support 36 extends in a forward direction with respect to the direction of travel A. Viewed in plan, the pivot shaft 37, fastened to the foremost end of the support 36, is parallel to the end portions 21 of the cranks 16 of the remaining rake wheels. Around the inner circumference of the ring 35 three shafts 39, secured to the ring 35, are equi-spaced apart, each being at right angles to the plane of the ring 35 and each being entered, near the end remote from the ring 35, in a ball bearing 40, by means of which a roller 41 is freely rotatable about the respective shaft 39. Each of the three rollers 41 has an uninterrupted groove 42 (FIG. 4) and these grooves hold between them a sheet material hub 43 of the rake wheel 9. As shown in FIG. 3, the space inside the ring 35, and therefore inside the hub 43, is completely free of structural elements of the rake wheel 9 and its suspension so that the rake wheel 9 has a comparatively large, central hole. The diameter of this hole is about 30 to 50% of the outer diameter of the rake wheel 9.

By means of clamping plates 44 a large number of torsional rods 45 is clamped against the hub 43 of the rake wheel 9. The torsional rods 45, which constitute at the same time the spokes of the rake wheel, have root portions which extend from the circumference of the annular hub 43 in a tangential direction with respect to the hub 43 rearwardly with respect to the direction of operative rotation B of the rake wheel, and which are freely movable in holes in a felly 46 (FIG. 3). Directly outside the felly 46 the rods 45 are bent over so as to extend forwards with respect to the direction of rotation B to form tine carriers 47. At their outer ends the tine carriers 47 are bent over so as to extend rearwards with respect to the direction of rotation B and thus form tines 48.

The bearing assembly 35/39, 39, 39/41, 41, 41 of the rake wheel 9, as well as the hub 43 of this rake wheel 9 is located around the beam-like frame portion 3 which extends through the central circular hole in the rake wheel 9 so that the pivot shaft 4 for the drawbar 5 is directly connected with the frame beam 2 through the rake wheel 9 by means of the short, straight beam 3.

In FIG. 3 the frame beam 3 can be seen, through the hole in the rake wheel, in a rest position of the device, whereat it is substantially diametrical to the hole. As shown in FIG. 3 the pivot shaft 37 of the support 36 is located outside the boundary of the hub 43 and, measured in a vertical direction, is substantially at the level of the centre of the hole hounded by the hub 43. As also shown in FIG. 3, the inner boundaries of the hub 43 and of the bearing 35 substantially coincide. It should furthermore be noted that the rake wheel 9 is located near, or at a short distance in front of, the centre of the row of rake wheels. A prolongation of the drawbar 5 intersects the rake wheel 9. In the rest position of the device the beam 3 is located near the centre of the hole bounded by the rake wheel 9.

Near its top the ring 35 has fastened to it the trailing end of a tension spring 49 (FIGS. 1 and 3). Away from this fastening point on the ring 35 the spring 49 extends tangentially to the circumference of the ring 35 and forwardly with respect to the direction of travel A towards the frame beam 2. At its leading end, like the springs 23 of the other rake wheels, the spring 49 is fastened to the set rod 24. The center line of the spring 49 is located at a distance above the centre line of the pivot shaft 37, just as the center lines of the springs 23 are located at a distance above the centre lines of their associated bearings 22.

The device described may be employed as a side-delivery rake or tedder and is capable, owing to the above-described flexible structure of the tines of the rake wheels, of very effectively matching unevennesses of the ground. However, there may be unevennesses of the ground of comparatively large size and in large numbers, and such devices may be operated at very high travelling speeds, usually on large fields, where saving of working time is more important than neatness of the work. As a result, the device is subjected to very rough handling and comparatively very high forces are exerted on the device. It is for these reasons that it is desirable to mount the rake wheels on pivotable cranks as described even though the flexible connections 17,19 and 45,47 respectively of the tines 20 and 48 respectively are capable of absorbing unevennesses of the ground. With regard to rough treatment, since all the rake wheels 7 to 13 are connected with the frame beam 2 so as to be movable in upward and downward direction, the assembly of rake wheels as a whole is movable up and down with respect to the frame in order to absorb heavy shocks. The weight of the rake wheels is at least partly balanced by means of the springs 23 and 49 respectively so that only a part of the weight of each rake wheel bears on the ground. The force by which the rake wheels bear on the ground is adjustable by means of the setting device 26. When varying the length of the setting device measured in a direction parallel to the beam 2, the rod 24 shifts in the bearings 25 with respect to the frame beam 2 so that the leading fastening points of the springs 23 and 49 are displaced with respect to the frame beam 2, the tension of the springs is varied, and hence also the force by which each rake wheel bears on the ground is varied.

The resultant of forces exerted by the ground on the tines of the rake wheels and by the crop on the row of take wheels extends, viewed in plan, substantially across the center of the length of the row of rake wheels and is substantially at right angles to the direction of this row (arrow C in FIG. 1). The direction of the drawbar 5 is, therefore, preferably adjusted so that, viewed in plan, the center line of the drawbar 5 and the resultant of forces C intersect one another at the center of the row of rake wheels. The orientation of the trailing ground wheel 29 is set, with respect to the frame of the device, to compensate for the whole momentum exerted on the whole device. Because this ground wheel is located at the largest distance from the fastening point 50 (FIG. 1) of the device of the tractor, as a result of which the ground wheel 29 need only absorb slight lateral forces, in can be fixed in the selected positions.

In previously proposed constructions the frame beam 2 is fastened to the drawbar 5 or the trestle by means of an arch-shaped beam which is rigidly secured to the top of the frame beam 2, which is bent upwardly away from the fastening point in the form of an arch over and across the neighbouring rake wheel and which then extends downwards to the junction with the drawbar 5. As a result of rough treatment in operation as discussed above this structure of the connection between the drawbar 5 and the frame beam 2 gives rise to very heavy forces and moments, as a result of which this fastening structure frequently breaks down after a comparatively short time of use. In a further proposed construction the fastening means between the drawbar 5 and the frame beam 2 extends from the frame beam 2 horizontally between two neighbouring rake wheels and the fastening structure extending from the frame beam 2 in a horizontal direction between two adjacent rake wheels in a rearward bend towards the fastening point of the drawbar 5. This construction is in the first place disadvantageous because it locally hinders the delivery of the crop. In the second place, because with this curved shape in the case of rough operation forces and moments of such a magnitude are involved, a breakdown may occur after a short time.

In the present fastening structure in the form of the short, beam-like frame portion 3 extending horizontally throughout its length and at right angles to the frame beam 2 and passing through one of the rake wheels (the rake wheel 9) towards the pivot shaft 4, to which the drawbar 5 is fastened, there occur, in the very short beam 3, appreciably lower forces and moments than in the above-discussed previously proposed fastening structures between the frame beam 2 and the drawbar 5. Nevertheless the rake wheel 9 can move unhindered up and down with respect to the frame beam 2 and the beam 3 and thus match heavy shocks, accommodated by the flexible tine support construction with minimal risk of a breakdown of the fastening structure 3.

The distance measured in a radial direction between the hub 43 and the felly 46 of the rake wheel 9 is smaller than that in the other rake wheels 7,8 and 10 to 13. It is desirable to equalize the extent of resilience in the support of the tines 48 to that of the tines 20 of the other rake wheels. In order to ensure equal lengths of the torsional rods 45 of the rake wheel and of the torsional rods 17 of the remaining rake wheels, having the same rod-diameters (the inner ends of the rods 17 being located inside a circle, the radius of which is equal to that of the hole bounded by the hub of the rake wheel 9), the torsional rods 45 extend substantially tangentially to a circle co-axial with the inner and outer circumferences of the hub 43 and disposed between these circumferences, as opposed to the torsional rods 17 of the rake wheels 7,8 and 10 to 13 so that, as compared with the rods 17, the rods 45 are more steeply inclined rearwards with respect to the direction B of the rake wheel rotation. With this tangential disposition of the torsional rods 45 the length of these rods can be equal to that of the torsional rods 17 of the other rake wheels so that an identical flexibility of the tines 48 can be obtained.

The bearing assembly 35/39,39,39/41/41,41,41 of the rake wheel 9 turns together with the rake wheel 9 about the pivot shaft 37 and is supported by the force of the spring 49, which is adjustable by displacing the rod 24, while the hole inside the hub 43 is sufficiently large for allowing movement of the rake wheel 9 with respect to the beam 3 in the case of rough treatment.

The ground wheel 34, the orientation of which with respect to the frame can change during operation, is supported by an extension arm 51 extending horizontally away from the frame beam 2 on that side of the frame beam 2 which is remote from the row of rake wheels. As shown in FIG. 5, the ground wheel 34 has a wheel carrier 52 which is pivotable about a substantially vertical pivot shaft 53 with respect to the extension arm 51 and therefore with respect to the frame beam 2. The wheel carrier 52 and the pivot shaft 53 are fast with a horizontal lever 54 fastened to the top of the pivot shaft 53 and whose end remote from the pivot shaft 53 is provided with a substantially vertical pin 55 to which is journalled one end of a double-acting hydraulic shock absorber 56. The other end of the shock absorber 56 is journalled to a substantially vertical pin 57 on the top of the frame beam 2. The shock absorber 56 crosses the pivotal axis of the shaft 53 substantially at right angles.

During right speed running on uneven fields a freely pivotable ground wheel will move in a highly uncontrollable manner and may swing to and fro about its pivot axes at a high frequency. Deflections over large angles may occur and it often occurs that such freely pivotable ground wheels rotate through 360°. Obviously such a ground wheel does not contribute well to a stable support of the device. This unstable behaviour also occurs when the pivot axis of the ground wheel is located at a comparatively large distance in front of the rotary axis of the ground wheel. By using a shock absorber guarding the ground wheel from kinetic energy immediately at the beginning of a movement of the ground wheel about the pivot shaft 53 and converting the same into heat, it can be ensured that the rotary axis maintains its orientation substantially at right angles to the direction of movement A in an acceptable manner even during high speed running on uneven soil. In this case the pivot axis 53 can be disposed, viewed in plan, at a comparatively short distance in front of the rotary axis of the ground wheel.

FIG. 6 illustrates a different form of pivotable ground wheel 34, in which a rod 58 is pivotable about the pin 55 and is passed through a ring 59, the base of which is secured to an arm 60 which is pivotally fastened by means of a pin 61 to the top of the frame beam 2, or which may be rigidly mounted on the frame beam. The ring 59, the arm 60 and the pin 61 constitute a supporting element for the ground wheel. At a distance from the ring 59 the rod 58 has secured to it, one on each side of the ring, stops 62 and 63 which are not displaceable with respect to the rod 58 during operation, once they have been set a desired locations along the rod. Between each of the stops 62 and 63 and the opposing boundary surface of the ring 59 there are compression springs 64 and 65 respectively that are mounted on the rod. Each compression spring 64 and 65 surrounds the rod 58 and is precompressed. A deflection of the ground wheel 34 about the substantially vertical pivot shaft 53 in either direction is counteracted immediately by that one of the springs 64 and 65 that is further compressed by this deflection, the springs as a whole turning about the pin 61 together with the rod 58. In this case a deflection of the ground wheel 34 about the pivot shaft 53 is directly and vigorously counteracted so that with a slight deflection during operation the ground wheel 34 can provide a lateral support for the device with respect to the ground. The pivot shaft 53 is located at a comparatively short distance in front of the rotary axis of the ground wheel 34. The position of the ground wheel 34 with respect to the frame 2 that is set by the action of the springs 64,65 can be varies by inserting the pin 61 optionally into one of a plurality of holes 64A extending in a row in the direction of length of the beam 2 in the top thereof so that when the position of the pin 61 is changed, the ground wheel is set at a new position. The ring 59 may, in an alternative construction, be fixable with respect to the rod 58 so that upon a deflection of the wheel 34 first the compression or the spring 64 of 65 has to be overcome; in this case the arm 60, in a preferred embodiment, is rigidly connected to the frame beam 2.

In the form shown in FIG. 7 the rod 58 is surrounded near its center by a sleeve 66, which is slidable with respect to the rod 58, but which can be fixed, if desired, in a central position by means of a pin (not shown) traversing the rod 58 and the sleeve 66. The sleeve 66 is bounded on each side by a ring 67 or 68 also surrounding the rod 58. Between the rings 67 and 68 and the stops 62 and 63 there are compression springs 69 and 70 respectively. The sleeve 66 passes through the hole of the ring 59. Where the sleeve 66 is fixed to the rod 58, the arm 60 is adjustable as described above. Alternatively the arm 60 is rigidly connected to the frame beam 2, and the ring 59 is rigidly connected to the sleeve 66, in which case the rod 58 is slidable with respect to the sleeve 66.

In the illustrated construction, the thickness of the ring 59 measured in the direction of length of the rod 58 is smaller than the length of the sleeve 66 measured in the same direction. It is thus achieved that the ground wheel 34 can pivot freely through a comparatively small angle about the shaft 53. When the limit of this free pivotal movement is reached (while the sleeve 66 together with the rod 58, the rings 67 and 68, the springs 69 and 70 and the stops 62 and 63 can freely slide with respect to the ring 59, one of the rings 67 or 68 comes into contact with the ring 59, after which upon a further deflection of the ground wheel 34 the force exerted by the springs 69 and 70 is such that this further deflection of the ground wheel is vigourously counteracted. In this way the ground wheel 34 can freely adapt to the direction, but uncontrolled deflection beyond the limit of free pivotal movement about the pivotal axis 53 is avoided. In the case where the sleeve 66 is fixed in place with respect to the rod 58, the rod shifts in place only after transgression of a precompression of the springs 69 or 70, which has a very effective result with caster wheels of the kind shown in FIG. 6.

FIG. 8 shows a simple construction in which the rod 58 is provided at a distance from the pin 55 with a stop 71 which is rigidly secured to the rod 58. Between the stop 71 and the pin 55 the rod 58 is surrounded over part of its length by a sleeve 72 of friction material, which can be displaced along the rid 58 against considerable friction. The friction material of the sleeve 72 is embedded in a metal ring 73 which is welded to the arm 60 pivoted to the frame beam 2 by means of the pin 61. The sleeve and ring 72 and 73, the arm 60 and the pin 61 constitute again a supporting element for the ground wheel. In this embodiment it is achieved in a very simple manner that a turn of the ground wheel 34 about the pivot shaft 53 is counteracted from the very beginning by the frictional forces produced by the displacement of the rod 58 with respect to the friction material of the sleeve 72 so that a reciprocatory deflection of the ground wheel will occur only to a comparatively small extent.

A further embodiment of the caster ground wheel 34 is illustrated in FIG. 9, in which parts corresponding with those shown in the preceding embodiments are designated by the same reference numerals. The pivot shaft 53 rigidly fastened to the wheel carrier 52 is rotatable in a sleeve 74, which is rigidly secured to the extension arm 51 and which constitutes in a vertical sense a supporting member for the ground wheel 34. Near the top end of the pivot shaft 53 a ring 75 is provided, which is not displaceable with respect to the pivot shaft 53 in the axial direction. The ring 75 is located at a distance above the sleeve 74. Between the ring 75 and the sleeve 74 a spring 76 is disposed under compression. The sleeve 74 is urged in the first place by part of the weight of the device against the top of the wheel carrier 52. This force prevailing between the wheel carrier 52 and the sleeve 74 is increased by the precompression of the spring 76. Between the wheel carrier 52 and the supporting member 74 is fastened a ring 77 of friction material. The frictional ring 77 may be loosely disposed between the sleeve 74 and the wheel carrier 53. Owing to the axial force exerted on the ring 77 it is thus ensured that even the initiation of a deflection of the ground wheel 34 about the pivot shaft 53 with respect to the sleeve 74 is counteracted by the friction force generated between the friction ring 77 and the top of the wheel carrier 52 or the lower face of the sleeve 74 respectively, so that an unstable behaviour of the ground wheel 34 is avoided, whereas a change in the orientation of the ground wheel 34 is nevertheless allowed when the direction of movement A changes.

It is possible to combine the constructions shown in FIGS. 5 to 9 with one another.

The use of the constructions shown in FIGS. 5 to 9 of pivotable ground wheels is not limited to rake wheel devices as shown in FIGS. 1 to 4, and these constructions may also be employed in other machines. FIG. 10 illustrates a rotary harrow 78 driven by a tractor and that is fastened to the three-point lifting device of the tractor. The height of the tines of the rotors of the harrow 78 above the ground is determined by a roller 79 fastened to the frame of the harrow 78 and adjustable in a direction of height with respect to this frame. The frame of the harrow 78 is provided with rearwardly projecting arms 80 and 81, the rear parts of which support the frame of a seed drill 82, which is drawn by the harrow 78. To facilitate running through bends the frame of the seed drill 82 is supported near both ends by ground wheels 83 and 84, which are pivotable with respect to the frame of the seed drill 82. In order to obtain a stable disposition of these ground wheels the ground wheels 83 and 84 may be constructed as shown in any one of FIGS. 5 to 9. Though FIG. 10 shows an embodiment similar to that of FIG. 5, an embodiment of any one of FIGS. 6 to 9 may be employed.

While various features of the devices that have been described, and that are illustrated in the drawings, will be set forth in the following claims as inventive features, it is to be noted that the invention is not necessarily limited to these features and that it encompasses all of the features that have been described both individually and in various combinations.

We claim:

1. A device for displacing crop lying on the ground comprising a frame and a plurality of rotatable rake wheels supported on the frame by crank means that allows upward and downward movements of the wheels, said wheels being positioned to rotate and contact the ground, at least one of said wheels comprising bearing means that surrounds an enlarged center hole and said bearing means being interconnected to the frame by said crank means, said frame including a portion that extends through the hole with substantial clearance to interconnect with the remainder of said frame, said portion being displaceable within said hole relative to said one wheel during operation, whereby the latter can follow uneven ground.

2. A device as claimed in claim 1, wherein said bearing means includes a circular hub that rotatably supports said one rake wheel, said hub defining said center hole.

3. A device as claimed in claim 2, wherein in a rest position of the device, said frame portion extends substantially across the center of said hole.

4. A device as claimed in claim 1, wherein said rake wheels are mounted in a row on a frame beam inclined to the direction of travel and said support is located substantially between said one rake wheel and a frame beam extending along the row of rake wheels.

5. A device as claimed in claim 4, wherein a supporting tension spring interconnects said one wheel to the frame and extends tangentially to the bearing.

6. A device as claimed in claim 2, wherein, said hub is rotatably supported by spaced apart rollers and said rollers are fixed to a ring support that is pivoted to the frame.

7. A device as claimed in claim 6, wherein one side of said support is connected to the frame by a pivot having an axis located outside said hub, viewed at right angles to the plane of said one rake wheel.

8. A device as claimed in claim 7, wherein, viewed in a horizontal direction, said pivot axis is located substantially at the level of the center of said hole.

9. A device as claimed in claim 28, wherein, viewed at right angles to the plane of said one rake wheel, the inner boundary of said hub and that of said bearing means substantially coincide.

10. A device as claimed in claim 1, wherein said bearing means is attached to a respective crank that interconnects one said of said one rake wheel to the frame whereby that wheel can move up and down with respect to said frame.

11. A device for displacing crop lying on the ground comprising a frame and a plurality of rotatable rake wheels supported on the frame by crank means, said wheels being mounted in a row for free rotation responsive to contact with the ground and said wheels being connected to an elongated frame beam by crank means, at least one of said wheels comprising a ring-shaped hub that surrounds an enlarged central hole and said hub being mounted on bearing means that is interconnected to said beam by said crank means so that said one wheel is displaceable upwardly and downwardly within said hole with respect to said frame, a frame portion extending through said hole with substantial clearance to a connection with said beam and said portion comprising coupling means for attachment to a prime mover, said portion being displaceable within said hole relative to said one wheel during operation whereby the latter can follow uneven ground.

12. A device as claimed in claim 11, wherein said coupling means is pivotably connected to the remainder of said frame portion and fixable in any selected one of a plurality of positions.

13. A device as claimed in claim 12, wherein said coupling means and said beam are located on different sides of the row of rake wheels.

14. A device as claimed in claim 13, wherein said frame portion is rigidly secured to said beam.

15. A device as claimed in claim 14, wherein said one rake wheel is located substantially midway along the row of rake wheels.

16. A device as claimed in claim 15, wherein, viewed with respect to the normal direction of travel, said one rake wheel is located in front of the center of said row, and has the same diameter as the remaining rake wheels.

17. A device as claimed in claim 11, wherein said coupling means is a drawbar and a prolongation of said drawbar, when viewed in plan, is inclined to the row of rake wheel to intersect said one rake wheel.

18. A device as claimed in claim 11, wherein said hole has a diameter that is about 30 to 50% of that of said one rake wheel.

19. A device as claimed in claim 11, wherein said one rake wheel has tines supported by torsional rods that extend from said hub, substantially tangentially relative to the hub.

20. A device as claimed in claim 19, wherein the remaining rake wheels include further torsional rods that carry tines and at least one of said remaining wheels has a central hub connected thereto, said further rods extending a shorter distance than the first mentioned rods.

21. A device as claimed in claim 11, wherein said frame is supported by a ground wheel connected to said beam by arm means, said wheel being pivotable about an upwardly extending axis defined by a pivot on said arm means and said axis being located in front of the rotary axis of the ground wheel, said ground wheel being interconnected to the frame by stabilizing means that steadies the ground wheel during travel.

22. A device as claimed in claim 21, wherein said supporting element comprises friction means and said rod is passed through the friction means in a friction fit.

23. A device as claimed in claim 21, wherein said pivot is in a wheel carrier and friction material is arranged between said carrier and a supporting member interconnected to the frame.

24. A device as claimed in claim 23, wherein the friction material bears against said carrier under the weight of said device.

25. A device as claimed in claim 24, wherein a spring on said pivot urges the friction material against said carrier and also against the supporting member.

26. An agricultural implement comprising a frame movable over the ground and at least one ground wheel connected to support said implement, said wheel being journalled in a carrier and said carrier being pivoted on arm means connected to said frame, a stabilizing rod interconnecting said pivot to a supporting element on the frame and said rod being freely displaceable between limits relative to the element for a portion of its length to allow said wheel to pivot about an upwardly extending axis during travel, means resisting the displacement of the rod relative to said element when the rod displacement exceeds said limits, said rod being passed through an opening in said element, said rod mounting spring means and a fixed stop on each side of the element, a further stop for said spring means at each side of said element and said spring means being positioned at each side of the element between stops to resist the displacement of the rod and the pivoting of said wheel.

27. A device as claimed in claim 26, wherein said supporting element is fixable on said beam with respect to the sleeve by adjustment means to change the position of the ground wheel relative to said beam.

28. A device as claimed in claim 26, wherein a slideable sleeve on the rod extends through the supporting element between said further stops and the latter are retained by said rod and supporting element, each spring being located between an associated pair of stops that includes one of the fixed stops and one of said further stops.

29. An implement as claimed in claim 26, wherein a lever is fixed to the pivot and said rod interconnects the lever to said element, said element being held on an adjustable arm which is fixable to said frame in any one of a plurality of positions to change the angle of said rod and the position of said wheel.

* * * * *